FIG. 3
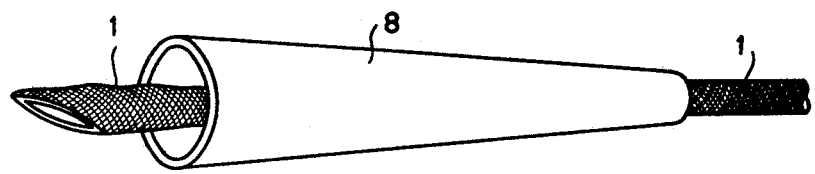
FIG. 4    FIG. 5    FIG. 6
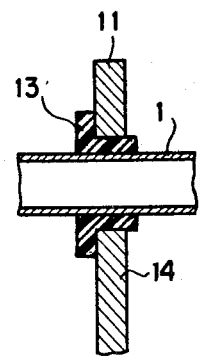 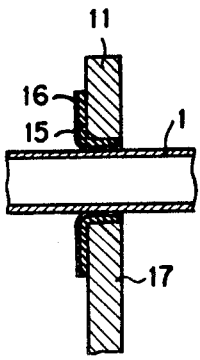 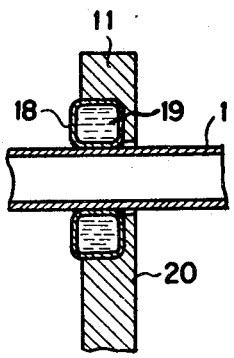
FIG. 7    FIG. 8
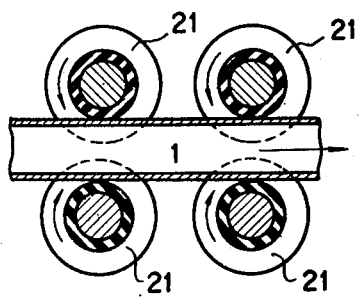 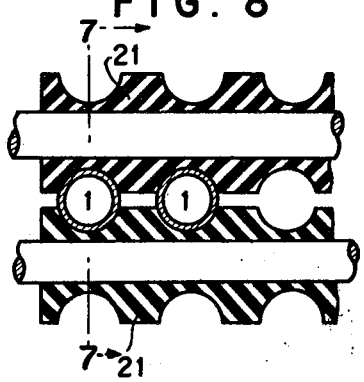
INVENTORS
*Takashi Onoyama*
*Sadayoshi Ichino*
BY
*Connolly and Hutz*
ATTORNEYS

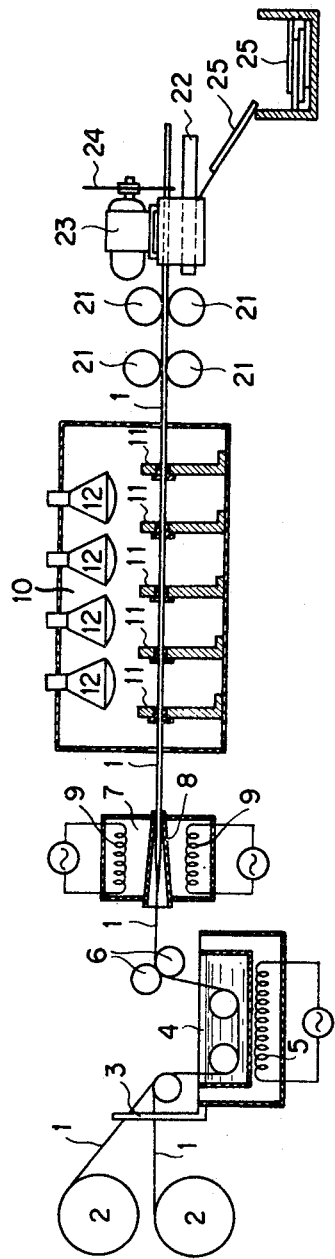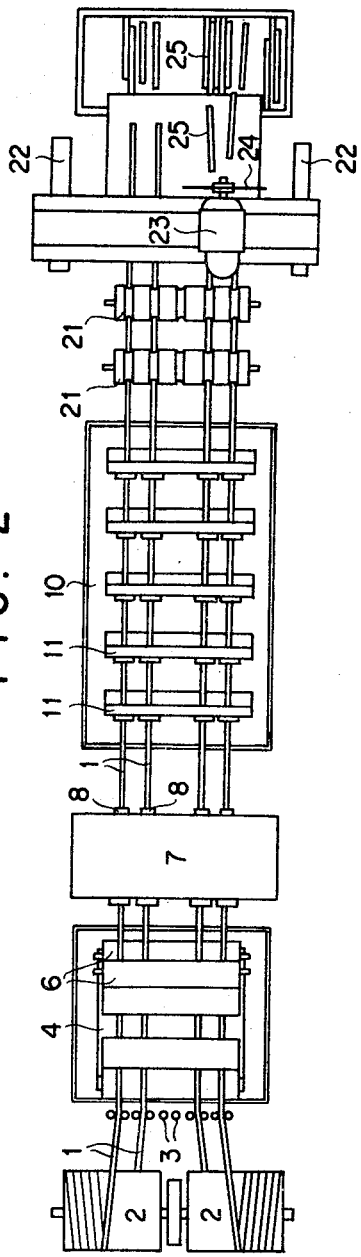

United States Patent Office 3,501,562
Patented Mar. 17, 1970

3,501,562
METHOD OF FORMING A RIGID TUBULAR BODY FROM A FLAT WOVEN SLEEVE
Takashi Onoyama, Tsu, and Sadayoshi Ichino, Mie Prefecture, Japan, assignors to Nippon Glass Fiber Co., Ltd., Tsu, Mie Prefecture, Japan, a corporation of Japan
Filed Jan. 18, 1968, Ser. No. 698,808
Int. Cl. B29g 5/00
U.S. Cl. 264—137                                           1 Claim

ABSTRACT OF THE DISCLOSURE

A flat bi-layered woven sleeve is impregnated with an appropriate adhesive agent and is then passed through a conical expanding device which separates the layers of the sleeve to form a continuous tubular body. The tubular body then passes through forming dies, and finally into a heat zone which dries the adhesive agent forming a rigid tube. The tube so formed is then cut to any length desired.

BACKGROUND OF THE INVENTION

This invention relates to an improved method of forming a tube from a flat, woven, adhesive-impregnated sleeve. The method of forming such a tube practiced in the prior art utilized a core rod corresponding to the desired final shape of the tube. This rod was manually inserted into the sleeve, and the sleeve and rod were then subjected to heat which gave the adhesive a permanent set in accord with the shape of the rod. The rod was then withdrawn leaving a rigid tube of the desired shape. This prior art method had many disadvantages including the need for considerable hand labor to pull the sleeve over the rod and then remove same. In addition, the tubing could only be formed in short lengths because of practical limitations on the length of core rod which could be handled by the workmen without the aid of expensive hoists. The prior art process had high rejection rates because of the great frictional drag between the rod and adhesive impregnated sleeve as the former was removed from the latter. This frictional drag also caused tears in the sleeve resulting in considerable production losses. The most detrimental aspect of the prior art process was its intermittent rather than continuous nature resulting in high labor costs with minimal production. All of these disadvantages are overcome by this invention.

BRIEF SUMMARY OF THE INVENTION

This invention relates to a method of forming rigid tubes from flattened woven sleeves, and has for an object the provision of a method where top quality tubes can be formed at very high production rates at a very low cost. An optional object is to provide an automated method of forming said tubes.

A principal feature of the invention lies in passing an adhesive coated flat woven sleeve through a conical expanding device which causes the upper and lower surfaces to part, thus forming a hollow tube. The tube so formed is then shaped by passage through forming dies in an area sufficiently heated to set the adhesive in the walls of the tube. The tube thus emerges from the method practiced in accordance with this invention in a rigid form with the desired shape imparted to it, ready for cutting to the desired size.

The above and other features of the invention will be more fully understood from the following detailed description and the accompanying drawings.

BRIEF DESCRIPTION OF THE DRAWINGS

FIG. 1 is a schematic diagram in elevation of the apparatus used in the practice of this invention.

FIG. 2 is a top plan view of the apparatus of FIG. 1.

FIG. 3 is an enlarged pictorial view of the enlarging device as used in this invention.

FIGS. 4 through 6 are fragmental cross-sectional views illustrating alternate embodiments of tube forming dies.

FIG. 7 is a cross-sectional view along the line 7—7 of FIG. 8.

FIG. 8 is a cross-sectional view through the center of the drawing rolls utilized in this invention.

DESCRIPTION OF THE PREFERRED EMBODIMENTS

Figure 9:
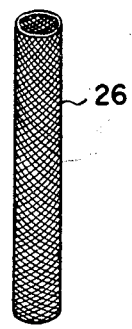
FIGS. 9 and 11 are pictorial views of tubes formed in accordance with this invention.

As shown in FIGS. 1 and 2, the woven sleeves 1 unwind from a plurality of storage drums 2 on which they are stored in a flattened state pending formation as per this invention. The flattened sleeves 1 are unwound in parallel lines with proper spacing maintained by a plurality of parallel guide bars 3. To facilitate explanation of this invention, the method as applied to a single sleeve will be explained although it is understood that the invention encompasses and envisions treatment of multiple sleeves. Sleeve 1 is led into a treating tank 4 containing a solution of adhesive agent such as starch, gelatine and CMC or adhesive agent containing synthetic resin such as phenol-resin, epoxy-resin or polyester resin. After being immersed and treated with said solution, the sleeve is drawn through a set of press rolls 6 to squeeze out the excess solution. Depending on the nature of the adhesive agent employed, the treating tank 4 may be designed as a double walled tank, the outer tank being equipped with an electric heater 5 serving to keep the adhesive solution in a liquid state where necessary.

The adhesive coated sleeve is then passed through the conical expanding device 8. As illustrated in FIGS. 1 and 3, the expanding device is of circular section with the diameter decreasing in the direction of the sleeve's travel therethrough. When the flattened woven sleeve 1 is put into this device, firstly the edges at the creases of the sleeve contact the inside surface of this device and are pressed inwardly as the sleeve goes forward. Pressed at the edges, the overlapped layers of the sleeve are separated and gradually the sleeve is expanded into a circular form since the circular section of the expanding device becomes smaller. Finally the outer periphery of the woven sleeve completely contacts the inside surface of the expanding device at the forward end of the device. Thus, the woven sleeve of circular section with a predetermined diameter corresponding to the smallest inside diameter of the enlarging device is formed. To accelerate the drying or setting of the adhesive it is sometimes desirable to place an electric heater 9 within a closed structure 7 surrounding and/or supporting the enlarging device 8. It should be understood that this heater 9 is not essential to the practice of this invention.

The now expanded woven sleeve 1 is led into a drier 10. Within the drier 10, it is passed through a plurality of forming dies or rings 11 while being heated by an appropriate heater 12 in accordance with the nature of the adhesive agent employed. The adhesive when dried by the heaters 12 hardens the woven sleeve, forming a rigid tube shaped in accordance with the forming dies 11.

The forming rings 11 may take various forms, e.g., a body 14 fitted with a flanged bushing 13 of synthetic resin, as shown in FIG. 4, or a body 17 fitted with a metal ring 15 whose surface is coated with a synthetic resin having smooth frictionless properties such as polytetrafluoroethylene (sold under the tradename Teflon by E. I. du Pont de Nemours & Co.) or silicone 16 as shown in FIG. 5 or a body 20 fitted with a water-cooling ring 18 which has a path 19 for circulating cooling water, as shown in FIG. 6.

In each of the above manufacturing steps, the treating temperature will differ greatly depending on the nature of the adhesive agent selected. For example, the treating temperature for gelatine as adhesive agent should be 40–60° C. in the treating tank 4 and in the expanding device 7, and around 185–190° C. in the drier 10. The suggested treating temperatures for phenol-resin are room temperature in the treating tank 4 and in the expanding device 7 and 210–220° C. in the drier 10.

The woven sleeve 1 thus solidified and formed is drawn by two mating rubber rolls 21 with low hardness, as shown in FIGS. 7 and 8 and is finally cut into complete tubes 25 of a specified length by an emery disc or cutter 24 suitably attached to a motor 23 which is supported on an adjustable guide 22.

Figure 10:
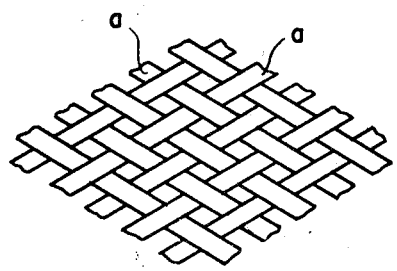
FIG. 10 is an enlarged fragmental view illustrating a weave pattern utilized in the tube construction of FIG. 9.
Figure 11:
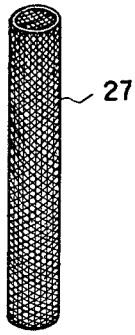
Figure 12:
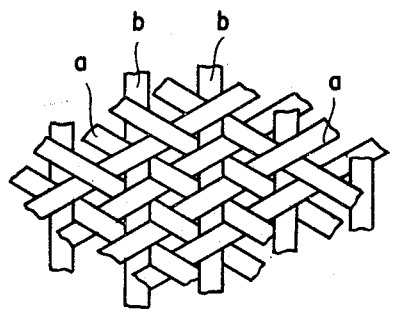
FIG. 12 is an enlarged fragmental view illustrating a weave pattern utilized in the tube construction of FIG. 11.

A variety of woven sleeves can be used in this invention. For purposes of illustration preferred weaves are shown in FIGS. 10 and 12. In FIG. 10 the threads or cords *a* of the sleeve 1 are woven in a crossing diagonal direction. This results in a tube with strong lateral rigidity. If additional longitudinal rigidity of the tube formed from the sleeve is desirable the weave of FIG. 12 may be used. In this latter weave longitudinal threads or cords *b* are woven into the normal diagonal pattern giving the sleeve, and eventually the tube formed therefrom, the desired strength in the longitudinal direction. In addition to the woven sleeves mentioned above, any form of continuous textile bag may be utilized.

What is claimed is:

1. A method of continuously forming an endless rigid tubular body of circular cross-section from a flat woven sleeve fabricated of elongate threads woven in a diagonal pattern relative to the longitudinal axis of the sleeve and having opposed creased edge portions, the method comprising the steps of impregnating the sleeve with adhesive, passing the impregnated sleeve into a conical expanding device to expand the sleeve by initially contacting the opposed creased edge portions thereof with the widest circular opening of the conical expanding device, drawing the impregnated sleeve through the conical expanding device to continually urge the opposed creased edge portions of the sleeve toward one another by contacting them with the conical expanding device until the sleeve is tubular and of circular cross-section, and drying the impregnated sleeve in its expanded tubular condition while passing the sleeve through a plurality of forming dies to thereby produce a rigid tubular body.

References Cited
UNITED STATES PATENTS

| | | | |
|---|---|---|---|
| 1,309,668 | 7/1919 | Waite | 264—134 XR |
| 2,602,766 | 7/1952 | Francis | 264—257 XR |
| 2,838,799 | 6/1958 | Meister | 264—129 |
| 2,324,645 | 7/1943 | Preher | 264—137 |
| 3,185,603 | 5/1965 | Boggs | 264—137 |
| 3,234,309 | 2/1966 | Graff | 264—95 |

ROBERT F. WHITE, Primary Examiner

R. R. KUCIA, Assistant Examiner

U.S. Cl. X.R.

264—103, 280